US006825979B2

(12) United States Patent
Ogawa

(10) Patent No.: US 6,825,979 B2
(45) Date of Patent: *Nov. 30, 2004

(54) OPTICAL SYSTEM HAVING A DIFFRACTIVE OPTICAL ELEMENT, AND OPTICAL APPARATUS

(75) Inventor: Hideki Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/156,960

(22) Filed: May 30, 2002

(65) Prior Publication Data

US 2003/0053212 A1 Mar. 20, 2003

Related U.S. Application Data

(62) Division of application No. 09/799,058, filed on Mar. 6, 2001, now Pat. No. 6,473,232.

(30) Foreign Application Priority Data

Mar. 8, 2000 (JP) ........................................ 2000-063398

(51) Int. Cl.[7] .............................................. G02B 27/44
(52) U.S. Cl. ....................... 359/565; 359/569; 359/570; 359/576
(58) Field of Search ............................... 359/656, 566, 359/569, 570, 571, 576, 565

(56) References Cited

U.S. PATENT DOCUMENTS

| 4,852,984 A | 8/1989 | Takahashi et al. |
| 4,871,243 A | 10/1989 | Ogawa et al. |
| 5,042,927 A | 8/1991 | Ogawa et al. ............... 359/683 |
| 5,044,706 A | 9/1991 | Chen .......................... 359/357 |

(List continued on next page.)

FOREIGN PATENT DOCUMENTS

| JP | 4-213421 | 8/1992 |
| JP | 4-214516 | 8/1992 |

(List continued on next page.)

OTHER PUBLICATIONS

M.W. Farn, et al., "Diffractive Doublet Corrected On–Axis at Two Wavelengths," Proceedings of the SPIE: International Lens Design Conference, vol. 1354, (Jun. 11–14, 1990), pp. 24–29.

C. Londoño, et al., "The Design of Achromatized Hybrid Diffractive Lens Systems," Proceedings of the SPIE: International Lens Design Conference, vol. 1354, (Jun. 11–14, 1990), pp. 30–37.

SPIE vol. 1354, pp. i–vii, 316–323, 297–309; International Lens Design Conference, Jun. 11–14, 1990, Monterey, CA; George N. Lawrence, Editor.

*Primary Examiner*—John Juba, Jr.
(74) *Attorney, Agent, or Firm*—Fitzpatrick, Cella, Harper & Scinto

(57) ABSTRACT

An optical system includes a diffractive optical element having a diffraction grating provided, on a lens surface having a curvature, in a concentric-circles shape rotationally-symmetrical with respect to an optical axis. The sign of the curvature of the lens surface having the diffraction grating provided thereon is the same as the sign of a focal length, at a design wavelength, of a system composed of, in the optical system, a surface disposed nearest to an object side to a surface disposed immediately before the lens surface having the diffraction grating provided thereon, and is different from the sign of the distance from the optical axis to a position where the center ray of an off-axial light flux enters the lens surface having the diffraction grating provided thereon. Further, the apex of an imaginary cone formed by extending a non-effective surface of the diffraction grating is located adjacent to the center of curvature of the lens surface having the diffraction grating provided thereon.

16 Claims, 9 Drawing Sheets

U.S. PATENT DOCUMENTS

| | | | | |
|---|---|---|---|---|
| 5,114,220 A | * | 5/1992 | Baude et al. | 351/160 R |
| 5,117,306 A | | 5/1992 | Cohen | 359/565 |
| 5,152,788 A | * | 10/1992 | Isaacson et al. | 156/73.1 |
| 5,170,207 A | | 12/1992 | Tezuka et al. | 355/53 |
| 5,241,421 A | | 8/1993 | Endo et al. | 359/684 |
| 5,285,314 A | | 2/1994 | Futhey | 359/565 |
| 5,528,427 A | | 6/1996 | Tanaka et al. | 359/683 |
| 5,537,259 A | | 7/1996 | Ogawa | 359/684 |
| 5,568,321 A | | 10/1996 | Ogawa et al. | 359/676 |
| 5,576,890 A | | 11/1996 | Tanaka et al. | 359/686 |
| 5,631,779 A | | 5/1997 | Kashima | 359/742 |
| 5,691,847 A | * | 11/1997 | Chen | 359/565 |
| 5,725,576 A | * | 3/1998 | Fedorov et al. | 351/159 |
| 5,737,120 A | * | 4/1998 | Arriola | 359/16 |
| 5,768,030 A | | 6/1998 | Estelle et al. | 359/691 |
| 5,789,462 A | * | 8/1998 | Motani et al. | 523/106 |
| 5,790,321 A | | 8/1998 | Goto | 359/742 |
| 5,790,902 A | | 8/1998 | Mizouchi et al. | 396/142 |
| 5,801,889 A | * | 9/1998 | Meyers et al. | 359/743 |
| 5,850,107 A | | 12/1998 | Kindt-Larsen et al. | 264/1.1 |
| 5,872,658 A | | 2/1999 | Ori | 359/677 |
| 5,899,585 A | | 5/1999 | Ogawa | 396/72 |
| 5,923,479 A | | 7/1999 | Nagata | 359/740 |
| 5,930,043 A | | 7/1999 | Ogawa | 359/566 |
| 5,959,785 A | | 9/1999 | Adachi | 359/692 |
| 5,978,145 A | | 11/1999 | Mukai et al. | 359/642 |
| 5,978,153 A | | 11/1999 | Nishio | 359/690 |
| 5,978,158 A | | 11/1999 | Nagata | 359/753 |
| 5,978,159 A | | 11/1999 | Kamo | 359/793 |
| 5,982,544 A | | 11/1999 | Ogata | 359/565 |
| 5,995,286 A | | 11/1999 | Mukai et al. | 359/571 |
| 6,002,519 A | | 12/1999 | Hayashi et al. | 359/557 |
| 6,008,942 A | * | 12/1999 | Ogusu et al. | 359/571 |
| 6,034,819 A | * | 3/2000 | Ogata | 359/558 |
| 6,052,234 A | | 4/2000 | Mukai et al. | 359/643 |
| 6,055,105 A | | 4/2000 | Boku et al. | 359/566 |
| 6,067,196 A | | 5/2000 | Yamamoto et al. | 359/565 |
| 6,069,743 A | | 5/2000 | Nagata et al. | 359/687 |
| 6,078,434 A | | 6/2000 | Ori | 359/691 |
| 6,081,389 A | | 6/2000 | Takayama et al. | 359/680 |
| 6,091,901 A | | 7/2000 | Ogawa | 396/55 |
| 6,097,547 A | | 8/2000 | Ogata et al. | 359/673 |
| 6,101,035 A | | 8/2000 | Maruyama | 359/565 |
| 6,115,188 A | | 9/2000 | Nishio et al. | 359/690 |
| 6,120,148 A | * | 9/2000 | Fiala et al. | 351/161 |
| 6,124,981 A | | 9/2000 | Ogawa | 359/675 |
| 6,130,785 A | * | 10/2000 | Abe et al. | 359/570 |
| 6,147,811 A | | 11/2000 | Fujibayashi | 359/689 |
| 6,154,323 A | | 11/2000 | Kamo | 359/691 |
| 6,157,488 A | * | 12/2000 | Ishii | 359/565 |
| 6,157,494 A | | 12/2000 | Nagata | 359/683 |
| 6,215,600 B1 | | 4/2001 | Nishimura et al. | 359/689 |
| 6,246,522 B1 | * | 6/2001 | Ishii | 359/571 |
| 6,262,846 B1 | * | 7/2001 | Nakai | 359/566 |
| 6,266,191 B1 | * | 7/2001 | Abe | 359/565 |
| 6,275,342 B1 | | 8/2001 | Sakamoto et al. | 359/691 |
| 6,285,507 B1 | | 9/2001 | Sakamoto | 359/642 |
| 6,392,805 B1 | * | 5/2002 | Ohmori | 359/569 |
| 6,542,301 B1 | | 4/2003 | Fujibayashi | 359/565 |
| 2001/0000015 A1 | * | 3/2001 | Nakai | 359/576 |
| 2003/0076591 A1 | | 4/2003 | Ohmori et al. | 359/566 |

FOREIGN PATENT DOCUMENTS

| | | |
|---|---|---|
| JP | 6-194571 | 7/1994 |
| JP | 6-324262 | 11/1994 |
| JP | 6-331898 | 12/1994 |
| JP | 6-347700 | 12/1994 |
| JP | 8-62504 | 3/1996 |
| JP | 9-197273 | 7/1997 |
| JP | 9-197274 | 7/1997 |
| JP | 9-197283 | 7/1997 |
| JP | 9-211329 | 8/1997 |
| JP | 9-265042 | 10/1997 |
| JP | 10-82952 | 3/1998 |
| JP | 10-82953 | 3/1998 |
| JP | 10-90596 | 4/1998 |
| JP | 10-111449 | 4/1998 |
| JP | 10-115777 | 5/1998 |
| JP | 10-148757 | 6/1998 |
| JP | 10-148768 | 6/1998 |
| JP | 10-148769 | 6/1998 |
| JP | 10-161020 | 6/1998 |
| JP | 10-186223 | 7/1998 |
| JP | 10-213744 | 8/1998 |
| JP | 10-268115 | 10/1998 |
| JP | 10-311946 | 11/1998 |
| JP | 10-311956 | 11/1998 |
| JP | 10-333036 | 12/1998 |
| JP | 10-339843 | 12/1998 |
| JP | 11-23968 | 1/1999 |
| JP | 11-52233 | 2/1999 |
| JP | 11-52236 | 2/1999 |
| JP | 11-52237 | 2/1999 |
| JP | 11-52238 | 2/1999 |
| JP | 11-52244 | 2/1999 |
| JP | 11-64726 | 3/1999 |
| JP | 11-72702 | 3/1999 |
| JP | 11-119096 | 4/1999 |
| JP | 11-133302 | 5/1999 |
| JP | 11-133305 | 5/1999 |
| JP | 11-149043 | 6/1999 |
| JP | 11-223766 | 8/1999 |
| JP | 11-271514 | 10/1999 |
| JP | 11-271616 | 10/1999 |
| JP | 11-295591 | 10/1999 |
| JP | 11-295598 | 10/1999 |
| JP | 11-305126 | 11/1999 |
| JP | 11-311743 | 11/1999 |
| JP | 11-326772 | 11/1999 |
| JP | 11-344671 | 12/1999 |

* cited by examiner

ANGLE OF INCIDENCE ($\theta$) OF RAY IN FIRST EMBODIMENT
(TELEPHOTO LENS)

|  | ON-AXIAL | OFF-AXIAL | | | |
|---|---|---|---|---|---|
| HALF ANGLE OF VIEW | 0° | 1.46° | 2.19° | 2.63° | 3.16° |
| MARGINAL RAY (UPPER RAY) | -0.55° | 0.62° | 1.2° | 1.54° | 1.95° |
| CENTER RAY OF LIGHT FLUX (PRINCIPAL RAY) | 0° | 0.99° | 1.48° | 1.78° | 2.13° |
| MARGINAL RAY (LOWER RAY) | 0.55° | 1.45° | 1.89° | 2.16° | 2.48° |

OPTICAL SYSTEM HAVING A DIFFRACTIVE OPTICAL ELEMENT, AND OPTICAL APPARATUS

This application is a division of application Ser. No. 09/799,058 filed Mar. 6, 2001, now U.S. Pat. No. 6,473,232.

BACKGROUND OF THE INVENTION

1. Field of the Invention

The present invention relates to an optical system having a diffractive optical element, and more particularly to an optical system suited to optical apparatuses, such as film cameras, video cameras, digital cameras, telescopes, projectors, etc., in which a diffractive optical element and a refracting optical element are combined to effect achromatism well.

2. Description of Related Art

Heretofore, as one of methods for correcting chromatic aberration of an optical system, there is a method of combining two glass materials (lenses) which differ in dispersion from each other.

As against such a conventional method of combining the two glass materials to diminish chromatic aberration, there is a method for diminishing chromatic aberration by providing, at a lens surface or a part of an optical system, a diffractive optical element, such as a diffraction grating, having a diffracting function, as disclosed in SPIE Vol. 1354 International Lens Design Conference (1990), Japanese Laid-Open Patent Application No. Hei 4-213421 (corresponding to U.S. Pat. No. 5,044,706), Japanese Laid-Open Patent Application No. Hei 6-324262 (corresponding to U.S. Pat. No. 5,790,321), U.S. Pat. No. 5,044,706, etc.

This method is based on the utilization of the physical phenomenon that a refractive surface and a diffractive surface in an optical system cause the behavior of chromatic aberration with respect to a ray of light of a certain reference wavelength to occur in respective opposite directions. Further, it is possible to make such a diffractive optical element have an aspheric-lens-like effect by varying the period of the periodic structure thereof, thereby greatly effectively lowering aberration.

Here, while, in the case of refraction, one ray of light remains being one ray of light even after being refracted, one ray of light, in the case of diffraction, is divided into a number of rays of various orders after being diffracted. Therefore, in a case where a diffractive optical element is used in an optical system, it is necessary that the grating structure of the diffractive optical element is decided in such a manner that light fluxes included in a useful wavelength region concentrate on one particular order (hereinafter referred to also as a design order), and it is necessary that the diffractive optical element has a diffraction efficiency excellent over the entire image plane.

With regard to the diffraction grating, there is proposed, in Japanese Laid-Open Patent Application No. Hei 10-268115 (corresponding to U.S. Pat. No. 5,995,286), an optical system using a diffraction grating of the blazed shape to aim at the evenness of the diffraction efficiency over the entire observation image plane.

In the above Japanese-Laid-Open Patent Application No. Hei 10-268115, there are disclosed a Keplerian viewfinder optical system arranged such that a diffraction grating of the blazed shape in which the height of a grating part at a marginal area of the diffraction grating is less than the depth of a grating part at a central area, around an optical axis, of the diffraction grating is used to make the diffraction efficiency at the central area approximately equal to that at the marginal area, and a Keplerian viewfinder optical system arranged such that a diffraction grating of the blazed shape in which a non-effective surface (a surface having no diffracting function in the diffraction At grating and corresponding to a side surface of the diffraction grating) in a central area around an optical axis is formed as a part of a cylindrical surface and a non-effective surface of a marginal area is formed as a part of a conical surface is used to prevent the shading of a ray of light at the non-effective surface in the marginal area.

In the Keplerian viewfinder optical systems as proposed in the above Japanese Laid-Open Patent Application No. Hei 10-268115, an on-axial light flux and a most off-axial light flux are separate from each other when passing through the position of a diffractive optical surface provided at a position relatively distant from a stop. Accordingly, this construction has such a characteristic that, without the above state of passing-through of rays of light, it is impossible to obtain the effect of evenness of the diffraction efficiency including the shading of a ray of light.

On the other hand, in a photographing optical system to which an optical system of the invention is assumed to be applicable, as is understandable from FIGS. 1, 2 and 3, which are used for the description of embodiments of the invention, an on-axial light flux and an off-axial light flux are relatively unseparate from each other in the interior of the optical system. Accordingly, even on a lens surface distant from a stop, the area of passing-through of the on-axial light flux and that of the off-axial light flux have a tendency to overlap each other.

Therefore, even if the structural arrangement disclosed in the above Japanese Laid-Open Patent Application No. Hei 10-268115 is applied to a photographic lens as it stands, it is difficult to obtain a diffraction efficiency excellent concurrently with respect to both the on-axial light flux and the off-axial light flux.

In particular, in the case of a photographic lens having a relatively-large aperture, since the respective areas, on which an on-axial light flux and an off-axial light flux are made incident, of a lens surface having a diffraction grating provided thereon overlap each other greatly, the above-mentioned difficulty increases.

BRIEF SUMMARY OF THE INVENTION

It is an object of the invention to provide an optical system having such high optical performance that, when effecting achromatism by combining a diffractive optical element and a refractive optical element, a diffraction efficiency excellent over the entire image plane can be obtained even if light fluxes which are to reach respective positions of the image plane overlap each other greatly on a diffractive optical surface.

To attain the above object, in accordance with an aspect of the invention, there is provided an optical system, comprising a diffractive optical element having a diffraction grating provided, on a lens surface having a curvature, in a concentric-circles shape rotationally symmetrical with respect to an optical axis, wherein the sign of the curvature of the lens surface having the diffraction grating provided thereon is the same as the sign of a focal length, at a design wavelength, of a system composed of, in the optical system, a surface disposed nearest to an object side to a surface disposed immediately before the lens surface having the diffraction grating provided thereon, and is different from the sign of a distance from the optical axis to a position where a center ray of an off-axial light flux enters the lens surface having the diffraction grating provided thereon.

Here, the sign of the curvature of the lens surface is considered positive if the center of curvature exists on a light-exit side (image side) with respect to the lens surface, and is considered negative if the center of curvature exists on a light-entrance side (object side) with respect to the lens surface. Accordingly, the curvature of a lens surface convex facing the object side (concave facing the image side) has a positive sign, and the curvature of a lens surface concave facing the object side (convex facing the image side) has a negative sign. On the other hand, the sign of the distance from the optical axis to the position where a center ray of an off-axial light flux enters the lens surface having the diffraction grating provided thereon is considered positive if the position where the center ray enters the lens surface exists on a side opposite to a side from which the center ray enters the optical system with respect to the optical axis, and is considered negative if the position where the center ray enters the lens surface exists on the same side as a side from which the center ray enters the optical system with respect to the optical axis. Accordingly, the distance from the optical axis to the position where a center ray of an off-axial light flux enters the lens surface has a negative sign if the center ray enters the lens surface before crossing the optical axis, and has a positive sign if the center ray enters the lens surface after crossing the optical axis.

Further, in accordance with another aspect of the invention, there is provided an optical system, comprising a diffractive optical element having a diffraction grating provided, on a lens surface having curvature, in a concentric-circles shape rotationally-symmetrical with respect to an optical axis, wherein an apex of an imaginary cone formed by extending a non-effective surface of the diffraction grating (a side surface of the diffraction grating) is located adjacent to the center of curvature of the lens surface having the diffraction grating provided thereon.

These and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
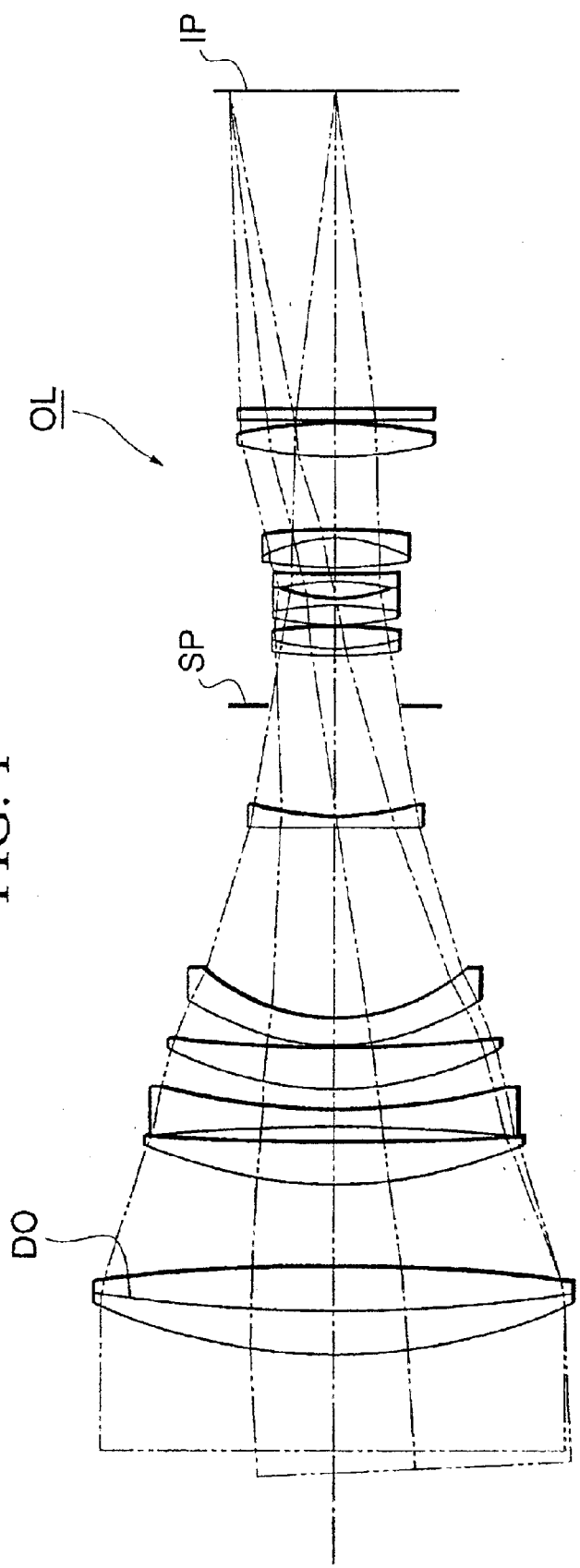
FIG. 1 is a sectional view of an optical system according to a first embodiment of the invention.
Figure 2:
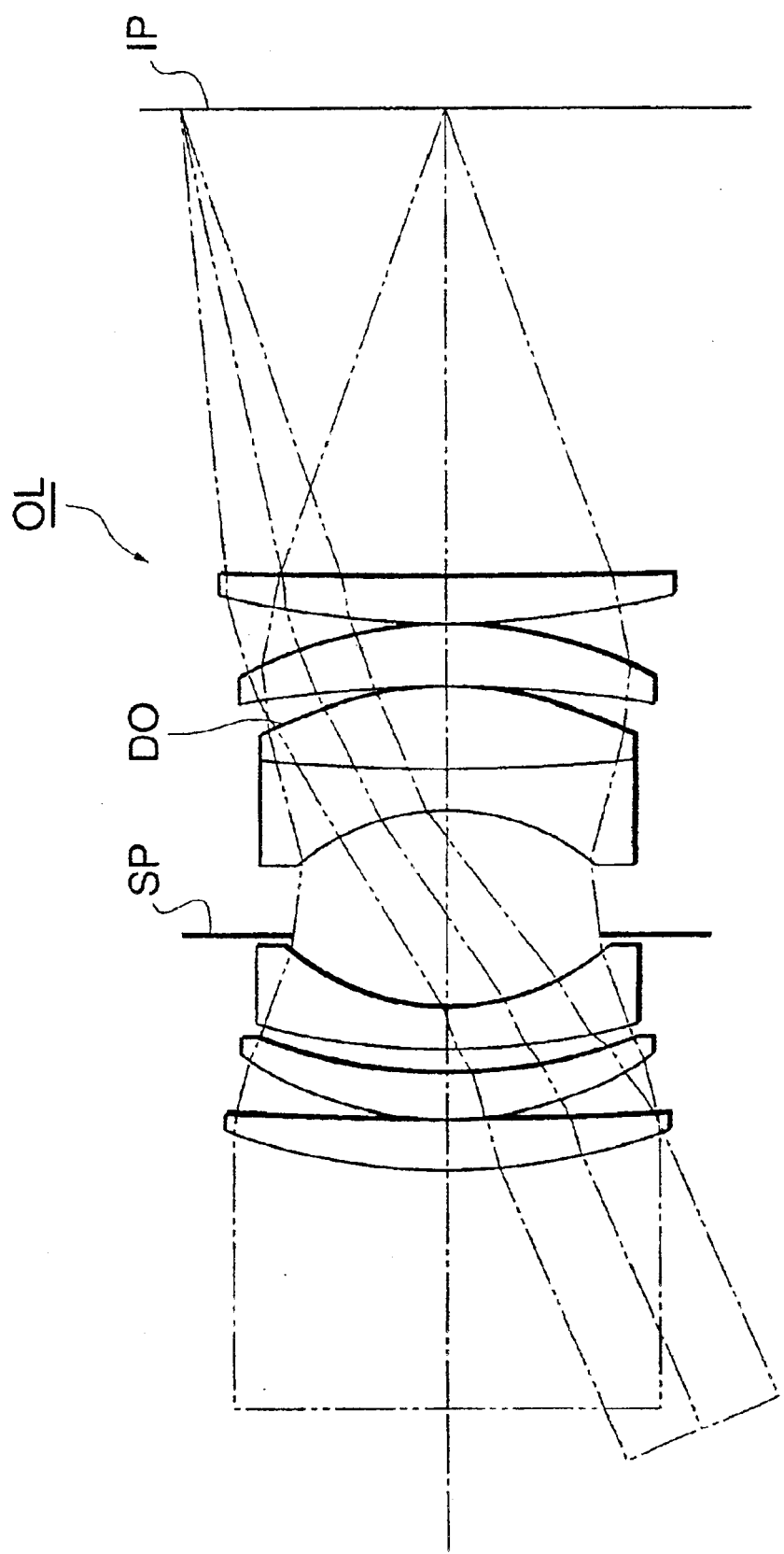
FIG. 2 is a sectional view of an optical system according to a second embodiment of the invention.
Figure 3:
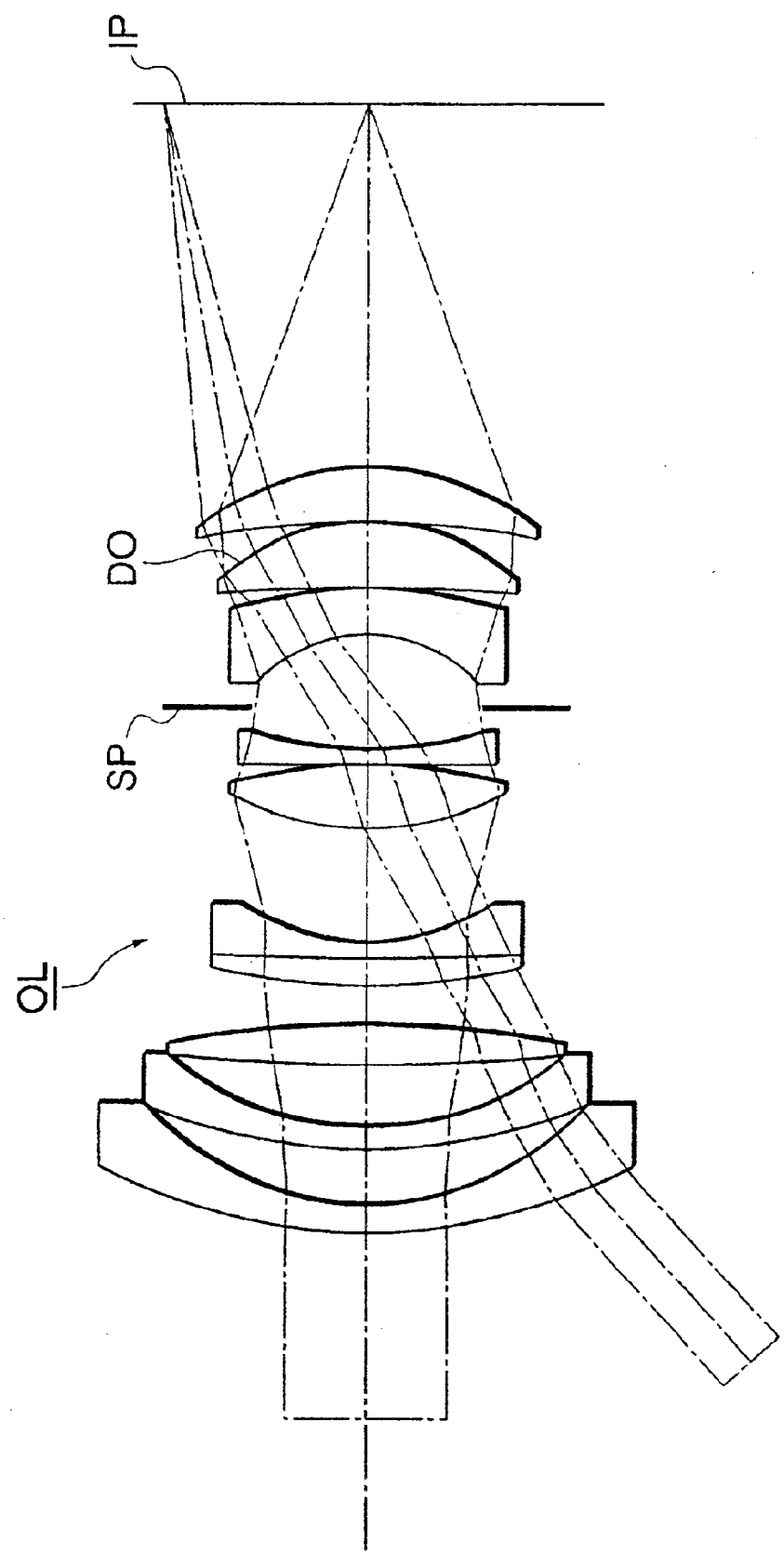
FIG. 3 is a sectional view of an optical system according to a third embodiment of the invention.

FIGS. 1, 2 and 3 are sectional views showing the essential parts of optical systems OL according to first, second and third embodiments of the invention, respectively. In the examples shown in FIGS. 1, 2 and 3, the invention is applied to the photographing optical systems OL of the telephoto type, of the Gauss type and of the inverted telephoto type, respectively. In FIGS. 1, 2 and 3, reference character DO denotes a diffractive optical surface which is a lens surface having a diffraction grating provided thereon. The diffraction grating is formed in a concentric-circles shape rotationally-symmetrical with respect to an optical axis, and the form of a section of the diffraction grating is the blazed type. Reference character SP denotes an aperture stop for determining the brightness of the optical system OL, and reference character IP denotes an image plane.

Figure 4:
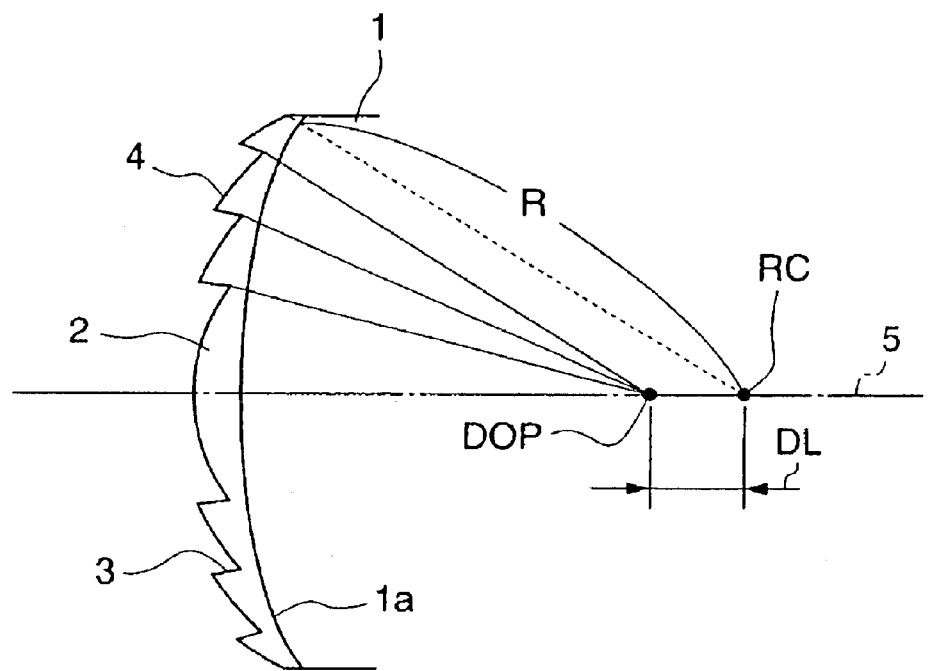
FIG. 4 is a sectional showing, in outline, a diffractive optical surface in which both a diffraction grating and a lens surface having the diffraction grating provided thereon are positive in optical power.
Figure 5:
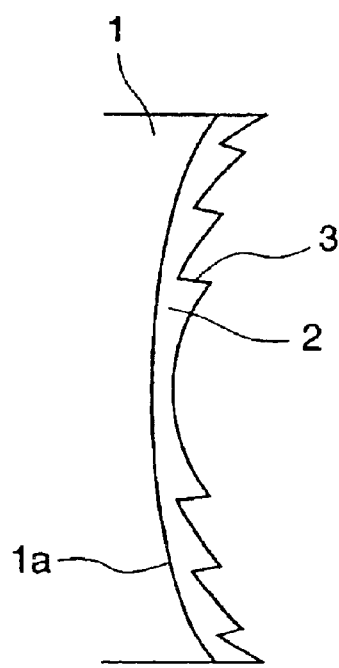
FIG. 5 is a schematic diagram showing, in outline, a diffractive optical surface in which both a diffraction grating and a lens surface having the diffraction grating provided thereon are negative in optical power.

FIGS. 4 and 5 are diagrams for explaining the diffractive optical surface according to the invention. In the state shown in each of FIGS. 4 and 5, a diffraction grating 2 of the blazed type is provided on a lens surface 1a on one side of a lens 1. In FIG. 4, reference numeral 4 denotes an effective surface having a desired diffracting function of the diffraction grating, and reference numeral 3 denotes a side surface which is obtained when forming the diffraction grating 2 of the blazed type on the lens surface 1a and does not take part in the diffracting function (hereinafter referred to as the "non-effective surface").

The non-effective surface 3, when being imaginarily extended, intersects an optical axis 5 at one point, and is a part of the conical surface of an imaginary cone thus formed with such an intersection point taken as an apex thereof. In FIG. 4, the apex of such an imaginary cone is denoted by reference character DOP, and the center of curvature of the lens surface 1a is denoted by reference character RC.

In each of the first to third embodiments, the apex DOP is made to be located adjacent to the center of curvature RC. Here, the location adjacent to the center of curvature RC means that the following condition is satisfied:

$|DL/R|<0.3$ where DL is the distance from the apex DOP of the imaginary cone to the center of curvature of the lens surface $1a$, which is a base having the diffraction grating provided thereon, and R is the radius of curvature of the lens surface $1a$.

In each of the first to third embodiments, the directions of incidence of rays from an on-axial object point (an on-axial light flux) on the lens surface, which is a base having the diffraction grating provided thereon, are respectively made approximately equal to the directions of normal lines at intersection points where the rays intersect the lens surface having the diffraction grating provided thereon. For example, the height of each zone of the diffraction grating is set to such a height that the diffraction efficiency of a ray of light coincident with the optical axis becomes 100% (such a height that an optical path length becomes an integer times the design wavelength), and is made uniform in the directions of the normal lines of the lens surface having the diffraction grating provided thereon. This arrangement makes it possible to set the diffraction efficiency for the on-axial light flux to almost 100%.

As a result, shading of the whole on-axial light flux is prevented, so that it is possible to heighten the diffraction efficiency.

First, the diffraction efficiency for the on-axial light flux among light fluxes to be diffracted by the diffractive optical surface will be described.

In each of the first to third embodiments, the sign of the curvature Ra (i.e, 1/R) of the lens surface having the diffraction grating provided thereon (for example, the sign of the curvature of a concave surface facing the image side (the light-exit side) being positive and the sign of the curvature of a convex surface facing the image side being negative) is made to be the same as the sign of a focal length "fa", at the design wavelength, of a composite system composed of a surface disposed nearest to the object side (the light-entrance side) to a surface disposed immediately before the lens surface having the diffraction grating provided thereon in the optical system. In the case of the first embodiment shown in FIG. 1, both the curvature Ra and the focal length "fa" have a positive sign, and in the cases of the second and third embodiments shown in FIGS. 2 and 3, both the curvature Ra and the focal length "fa" have a negative sign.

In this instance, the directions of incidence in which rays of light constituting the on-axial light flux reaching the center of the image plane enter the lens surface having the diffraction grating provided thereon respectively become approximately equal to the directions of normal lines at intersection points where the rays of light intersect the lens surface having the diffraction grating provided thereon. In such a state, the apex DOP of the imaginary cone, a part of which is formed by the non-effective surface of the diffraction grating, is made to be located adjacent to the center of curvature RC (the position on which the normal lines concentrate) of the lens surface having the diffraction grating provided thereon. By this arrangement, the shading of on-axial rays of light at the non-effective surface of the diffraction grating is lessened, so that the diffraction efficiency is prevented from lowering due to shading.

Next, the diffraction efficiency for the off-axial light flux among light fluxes to be diffracted by the diffractive optical surface will be described.

In each of the first to third embodiments, the sign of the distance Ha from the optical axis to a position where the center ray of the off-axial light flux enters the lens surface having the diffraction grating provided thereon (the sign of the distance Ha is considered positive if the position of incidence on the lens surface is on a side opposite to the side from which the center ray enters the optical system with respect to the optical axis, and is considered negative if the position of incidence on the lens surface is on the same side as the side from which the center ray enters the optical system with respect to the optical axis, and, accordingly, the distance Ha has a positive sign if the center ray enters the lens surface after crossing the optical axis.) is made to be different from the sign of the curvature Ra of the lens surface having the diffraction grating provided thereon. In the case of the first embodiment, Ha<0 and Ra>0 and in the cases of the second and third embodiments, Ha>0 and Ra<0.

In this instance, similarly to the case of the on-axial light flux, the directions of incidence in which rays of light constituting the off-axial light flux reaching the margin of the image plane enter the lens surface having the diffraction grating provided thereon respectively become approximately equal to the directions of normal lines at intersection points where the rays of light intersect the lens surface having the diffraction grating provided thereon.

Accordingly, similarly to the case of the on-axial light flux, the apex DOP of the imaginary cone, a part of which is formed by the non-effective surface 3 of the diffraction grating, is made to be located adjacent to the center of curvature RC (the position on which the normal lines concentrate) of the lens surface having the diffraction grating provided thereon. By this arrangement, the shading of rays of light of the off-axial light flux reaching the margin of the image plane at the non-effective surface of the diffraction grating is lessened, so that the diffraction efficiency can be prevented from lowering.

Further, the directions of incidence in which rays of light constituting the off-axial light flux reaching the margin of the image plane enter the lens surface having the diffraction grating provided thereon respectively become approximately equal to the directions of normal lines at intersection points where the rays of light intersect the lens surface having the diffraction grating provided thereon. Therefore, it is possible to obtain a high diffraction efficiency even while keeping the height of the zone of the diffraction grating decided on the basis of the on-axial light flux as mentioned in the foregoing.

According to the invention, with the arrangement as described above, it is possible to lessen the shading over the entire image plane, thus obtaining a high diffraction efficiency, and, in particular, to mitigate the adverse effect of color flare occurring due to unnecessary diffracted rays of color light fluxes at the time of photographing a high-luminance object.

While, in the invention, with the various elements thereof defined as described above, there is attained an optical system having good optical performance over the entire image plane, it is preferable to further satisfy at least one of the following structural conditions.

With such a condition satisfied, it is possible to further lessen shading, at the non-effective surface of the diffraction grating, of a light flux reaching the center or thereabout of the image plane, which is of relatively great importance in image quality, and it is possible to further improve the diffraction efficiency for a light flux reaching the center or thereabout of the image plane.

(A-1) The following condition is satisfied:

$$|D/R|<5 \tag{1}$$

where D is a distance from the position of the center of curvature of the lens surface having the diffraction grating provided thereon to the position of a focus, at the design wavelength, of a combined system composed of a surface disposed nearest to the object side to a surface disposed immediately before the lens surface having the diffraction grating provided thereon in the optical system, and R is the radius of curvature of the lens surface having the diffraction grating provided thereon.

If the upper limit of the condition (1) is exceeded, the diffraction efficiency, in particular, around the center of the image plane deteriorates disadvantageously. In the invention, it is more preferable to alter the numerical range of the condition (1) as follows:

$$|D/R|<3 \tag{1)'}$$

thereby further improving the diffraction efficiency.

(A-2) The following condition is satisfied:

$$C_1 \cdot P < 0 \tag{2}$$

where P is a refractive power of the lens surface having the diffraction grating provided thereon, and $C_1$ is a phase coefficient for a second-degree term when a phase shape of the diffraction grating is expressed by the following equation:

$$\phi(Y)=(2\pi/\lambda_O)(C_1 Y^2+C_2 Y^4+C_3 Y^6+\ldots) \tag{a}$$

where Y is the height in the vertical direction from the optical axis, $\lambda_O$ is the design wavelength, and $C_i$ is a phase coefficient (i=1, 2, 3 . . . ).

The condition (2) is provided for manufacturing the diffraction grating according to the invention with high accuracy.

The technical significance of the condition (2) will be described below.

An optical power $\phi_D(\lambda, m)$ of the diffractive surface (corresponding to a refractive power and expressed by the reciprocal of the focal length) for an arbitrary wavelength $\lambda$ and an arbitrary diffraction order can be expressed by the following equation, using the phase coefficient C, in the above equation (a):

$$\phi_D(\lambda, m)=-2C_1 m\lambda/m_O\lambda_O \tag{b}$$

Thus, an optical power of the diffractive surface for the design wavelength $\lambda_O$ and the design diffraction order $m_O$ becomes as follows:

$$\phi_D(\lambda_O, m_O)=-2C_1 \tag{c}$$

In other words, the condition (2) means that the optical power $\phi_D(\lambda_O, m_O)$ of the diffraction grating for the design wavelength and the design diffraction order is set to have the same sign as the sign of the refractive power of the lens surface having the diffraction grating provided thereon.

Further, the significance which such an arrangement gives in the invention will be described below on the basis of two kinds of blazed shapes, between which the sign of the phase coefficient $C_1$ varies, with reference to FIGS. 4 and 5.

FIGS. 4 and 5 are sectional views respectively showing, in outline, diffraction gratings which are formed into the different blazed shapes, between which the sign of the phase coefficient $C_1$ varies, on the basis of the condition (1). In each of the diffraction gratings shown in FIGS. 4 and 5, the sign of the refractive power P of the lens surface 1a having the diffraction grating 2 provided thereon is set in such a way as to satisfy the condition (2). In the case of the diffraction grating shown in FIG. 4, $C_1<0$ (the optical power of the diffraction grating having a positive value), and P>0. In the case of the diffraction grating shown in FIG. 5, $C_1>0$ (the optical power of the diffraction grating having a negative value), and P<0. As mentioned in the foregoing, in FIG. 4, the diffraction grating 2 is provided on the lens surface 1a of the lens 1, and the apex DOP of the imaginary cone formed by the non-effective surface 3 of the diffraction grating 2 is located adjacent to the center of curvature RC of the lens surface 1a having the diffraction grating 2 provided thereon.

As the methods for manufacturing diffraction gratings of such a blazed shape, there are a method of performing press molding with a mold or the like while fusing glass at a high temperature, a method of performing press molding of ultraviolet-curable plastic or the like with a mold on the surface of a glass substrate or the like and curing the plastic with radiation of an ultraviolet ray, a method of molding plastic with a mold together with a lens, etc. Further, there are a method of forming a diffraction grating by directly cutting glass, and a method of forming a diffraction grating of the finely-stepped shape by wet-etching or dry-etching $S_iO_2$ or the like.

As is apparent also from FIGS. 4 and 5, since the non-effective surface 3 of the diffraction grating 2 is a part of the conical surface, if the sign of the refractive power P of the lens surface having the diffraction grating provided thereon or the sign of the optical power of the diffraction grating is made opposite to that adopted in the diffraction grating shown in FIG. 4 or 5, i.e., if $C_1 \cdot P>0$, there arise various problems in terms of workability. For example, in using a mold, it is difficult to work the mold, and, at the time of transfer on the mold, it is difficult for fused glass or plastic to intrude in the direction of the depth of the grating, thus causing the transferability to deteriorate. Further, at the time of the mold release, in the method of performing molding while fusing glass, the method of molding plastic with a mold together with a lens, etc., the mold can not be released in the worst state, and, at the most, a tip portion of the grating is damaged, thus causing the diffraction efficiency to deteriorate. In the method of transferring ultraviolet-curable plastic to a glass substrate or the like, while, since the viscosity of the plastic is relatively low, the mold may be somehow released, a tip portion or thereabout of the grating is deformed due to the stress occurring at the time of the mold release, thus also causing the diffraction efficiency to deteriorate.

In short, in the case of $C_1 \cdot P>0$, in whatever forming-method among the forming methods using a mold, the transferability of the mold, the releasability of the mold, etc., are deteriorated and it becomes impossible to obtain the desired diffraction efficiency. Therefore, it is preferable to satisfy the above condition (2).

(A-3) The diffraction grating is a diffraction grating of the laminated type (a laminated diffraction grating).

(A-4) The laminated diffraction grating is a diffraction grating of the adjacently-laminated type (an adjacently-laminated diffraction grating) in which at least one thin air layer is included and two diffraction gratings are disposed adjacent to each other across the thin air layer.

(A-5) The adjacently-laminated diffraction grating is provided between two adjacent lens surfaces having substantially the same curvature, and is composed of three layers, i.e., in order from the object side, a first layer, a second layer and a third layer, and the second layer is the thin air layer.

(A-6) The first layer and the third layer of the adjacently-laminated diffraction grating are formed with ultraviolet-curable plastic.

The above-mentioned structural conditions (A-3) to (A-6) are provided for defining the grating structure for heightening the diffraction efficiency over the entirety of the useful wavelength region. Each of the structural conditions (A-3) to (A-6) will be described in detail below.

As the method of heightening the absolute value of the diffraction efficiency over the entirety of the useful wavelength region, there is known a diffraction grating of the laminated type in which a plurality of blazed-type diffraction gratings are disposed in close contact with each other or adjacent to each other and the refractive indices and Abbe numbers of the materials of the respective diffraction gratings, the depths of the gratings, etc., are appropriately set.

Figure 6:
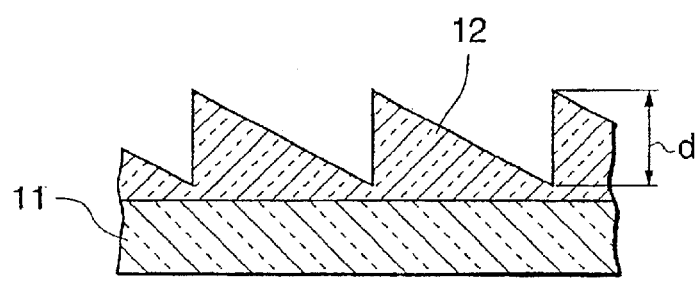
FIG. 6 is a sectional view showing, in outline, a single-layer diffraction grating.
Figure 7:
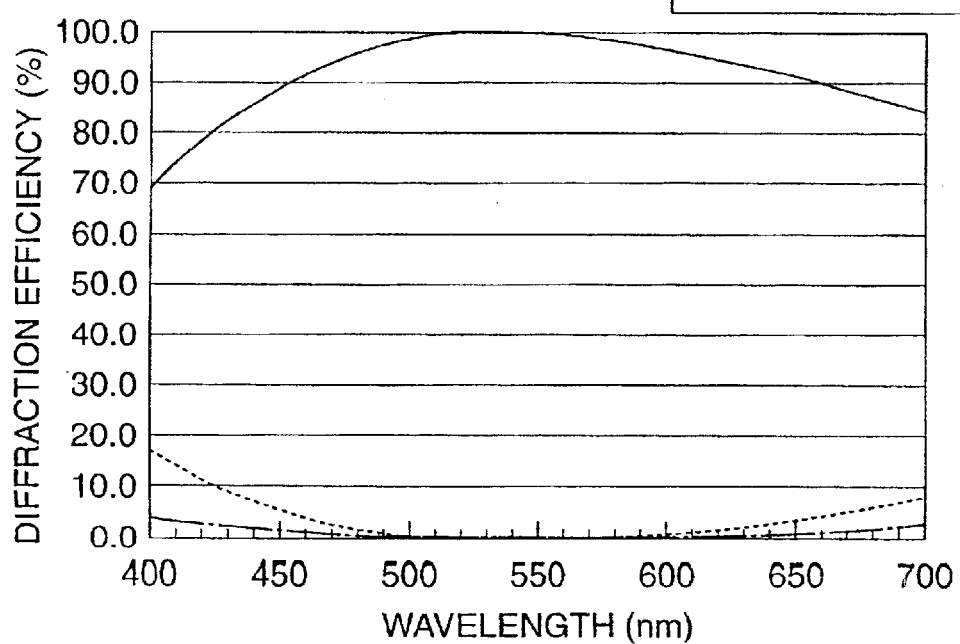
FIG. 7 is a graph showing the wavelength-dependent characteristic of the diffraction efficiency of the diffraction grating shown in FIG. 6.

FIG. 7 is a graph showing the wavelength-dependent characteristic of the diffraction efficiency, mainly for the first-order diffracted light, obtained when a light flux is made to vertically enter the single-layer blazed-type diffraction grating shown in FIG. 6. In the actual structure of the diffraction-grating, as shown in FIG. 6, ultraviolet-curable plastic is coated on the surface of a base material 11 to form a plastic portions and, on the plastic portion, there is formed a grating 12 having a grating thickness d arranged such that the diffraction efficiency for the first-order diffracted light at the wavelength of 530 nm becomes 100%. As is apparent from FIG. 7, the diffraction efficiency for the design order decreases accordingly as the wavelength goes away from the optimized wavelength of 530 nm, and, conversely, the diffracted light of the zero order and the second order near the design order increases. Such an increase of the diffracted light of the order other than the design order causes flare, thereby lowering the resolution of the optical system.

Figure 8:
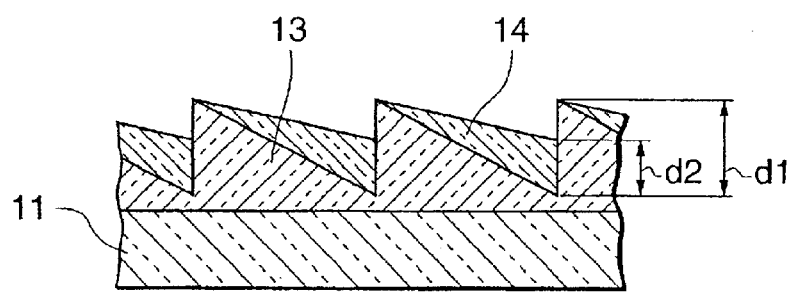
FIG. 8 is a sectional view showing, in outline, a laminated diffraction grating (of the close-contact laminated type).
Figure 9:
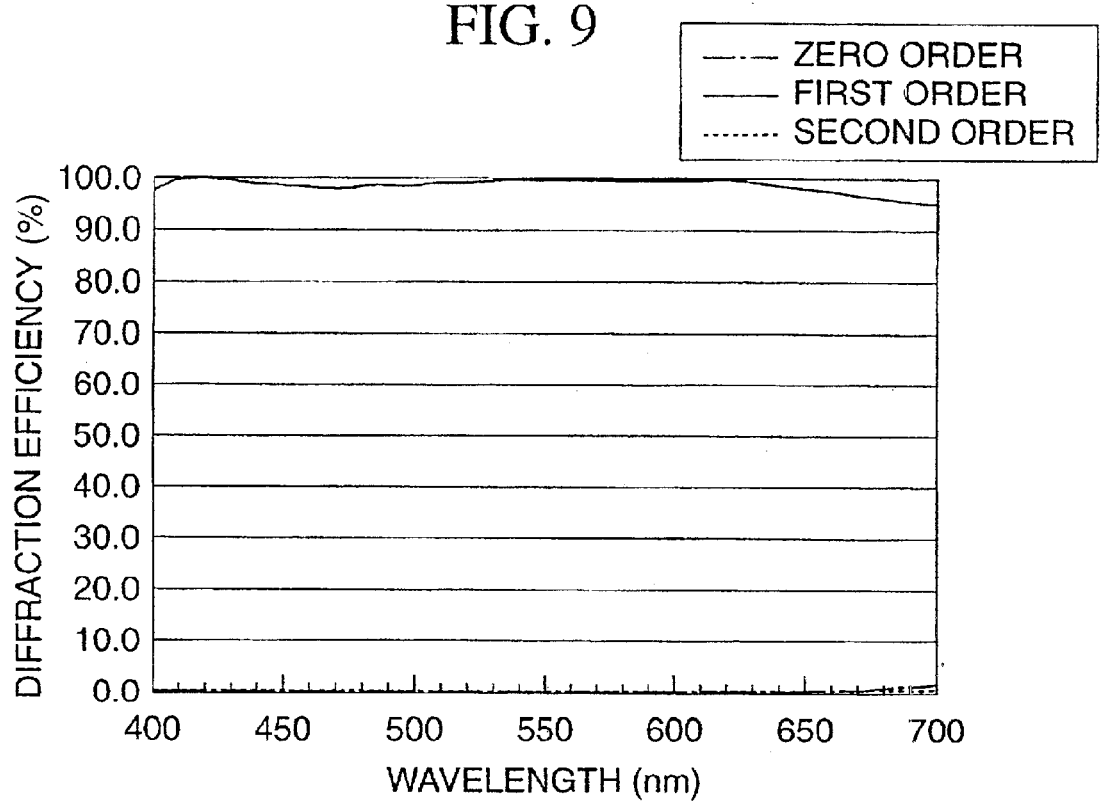
FIG. 9 is a graph showing the wavelength-dependent characteristic of the diffraction efficiency of the diffraction grating shown in FIG. 8.

On the other hand, FIG. 9 is a graph showing the wavelength-dependent characteristic of the diffraction efficiency, mainly for the first-order diffracted light, obtained when a light flux is made to vertically enter the diffraction grating of the close-contact laminated type shown in FIG. 8. In the specific structure of the diffraction grating, as shown in FIG. 8, a first diffraction grating 13 made from ultraviolet-curable plastic (nd=1.499, vd=54) is formed on a base material 11, and, on the first diffraction grating 13, there is formed a second diffraction grating 14 made from another ultraviolet-curable plastic (nd=1.598, vd=28). In such a combination of those materials, the grating thickness d1 of the first diffraction grating 13 is set to 13.8 µm, and the grating thickness d2 of the second diffraction grating 14 is set to 10.5 µm. As is apparent from FIG. 9, with the diffraction grating having this laminated structure, the diffraction efficiency for the design order becomes 95% or more over the entirety of the useful wavelength region.

As mentioned in the foregoing, with the diffraction grating of the laminated structure used as a diffraction grating according to each of the embodiments, it is possible to further improve optical performance. At the same time, with the above-described construction, it is possible to obtain a diffraction efficiency excellent in wavelength-dependent characteristic over the entire image plane. Therefore, it is preferable to use the diffraction grating of the laminated structure.

Next, the influence of the non-effective surface of the diffraction grating on the diffraction efficiency will be described below with respect to, among diffraction gratings of a laminated structure, a diffraction grating of the close-contact laminated type in which grating portions are in close contact with each other, and a diffraction grating of the adjacently-laminated type in which grating portions are disposed adjacent to each other across a thin air layer.

In a case where the above two types of diffraction gratings are made of the same material, since the depth of a grating portion required for obtaining the necessary diffracted light is inversely proportional to the absolute value of the difference of refractive indices of surfaces on the entrance side and the exit side of the grating portion, the diffraction grating of the adjacently-laminated type, which has an air layer, makes it possible to reduce the total of depths of the whole grating portion more than the diffraction grating of the close-contact laminated type.

As a result, the diffraction grating of the adjacently-laminated type lessens the shading of rays on the non-effective surface more than the diffraction grating of the close-contact laminated type, and is, therefore, advantageous with respect of an improvement in the diffraction efficiency.

Therefore, it is preferable to use the diffraction grating of the adjacently-laminated type, in which grating portions are disposed adjacent to each other across a thin air layer.

In this instance, if a lens, which is a component of the optical system, is so divided into two parts that lens surfaces obtained by this division have approximately the same curvature, and the diffraction grating of the adjacently-laminated type is provided on each of the lens surfaces, with the result that there are formed three layers, i.e., a first layer, a second layer and a third layer in order from the object side, the second layer being a thin air layer, it is possible to increase the diffraction efficiency with a relatively simple construction and without influencing the various aberrations of the entire optical system.

In a case where one lens is so divided into two parts that lens surfaces obtained by this division have approximately the same curvature, the curvatures of the lens surfaces hardly contribute to the various aberrations even if they are set to any values while being kept approximately the same. Therefore, it is possible to set the curvatures of the lens surfaces to values which are specialized for optimizing the diffraction efficiency around the center of the image plane and around the margin of the image plane. Accordingly, it is preferable to use the diffraction grating of the adjacently-laminated type having such a construction.

In this instance, the glass materials of the divided lens parts need not be the same, and may be varied according to necessity. In addition, if two lens surfaces, on each of which the diffraction grating is to be provided, exist from the beginning, before the diffraction grating is provided, for reasons of the structure for correcting aberration, such as chromatic aberration, spherical aberration or coma, and are such cemented surfaces that the conditions of curvature, etc., satisfy the arrangement of the invention, it is unnecessary to newly divide a lens, and the diffraction grating ought to be provided on the existing lens surfaces.

Figures 10, 11:
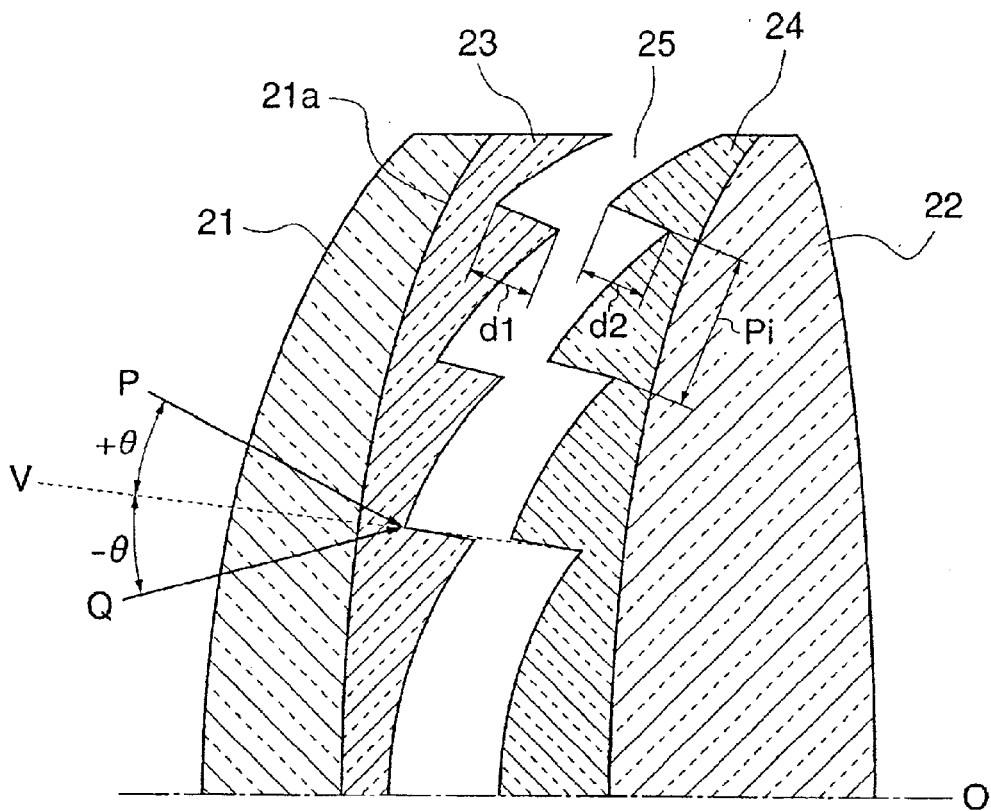
FIG. 10 is a sectional view showing, in outline, another laminated diffraction grating (of the adjacently-laminated type with an air layer).
FIG. 11 is a table showing angles of incidence ($\theta$), on a diffraction grating, of a center ray and marginal rays (upper and lower rays) among meridional rays of an on-axial light flux and an off-axial light flux entering the optical system according to the first embodiment of the invention.

FIG. 10 is an enlarged sectional view showing, in outline, a part of a diffraction grating of the adjacently-laminated type which is applied to the optical system of the first embodiment. In FIG. 10, reference numerals 21 and 22 denote lens parts into which one lens is so divided that lens surfaces obtained by this division have approximately the same curvature. Reference numerals 23 and 24 denote a diffraction grating serving as a first layer (nd=1.6685, vd=19.7) and a diffraction grating serving as a third layer (nd=1.5240, vd=50.8), respectively. Reference numeral 25 denotes an air layer serving as a second layer. Reference character O denotes an optical axis of the optical system. Further, reference characters P and Q denote rays incident on the diffraction grating 23. Reference character V denotes a normal line at an intersection point between the ray P (Q) and a lens surface 21a having the diffraction grating 23 provided thereon. Reference character e denotes an angle which the ray P (Q) makes with the normal line V of the lens surface 21a, with a positive angle being taken clockwise in FIG. 10. Further, reference characters d1 and d2 denote the grating thicknesses of the first layer and the third layer, respectively, being set to d1=5 μm and d2=7.5 μm. Reference character Pi denotes the grating pitch of the i-th zone of the first layer (the grating pitch of the i-th zone of the first layer being set equal to that of the third layer). The minimum grating pitch, which is on the 155th zone at the most marginal portion of the diffraction grating, is 156 μm.

Incidentally, a diffraction grating proposed in Japanese Patent Application No. Hei 11-213374 is applicable to the shape of the diffraction grating of the adjacently-laminated type.

Figure 12:
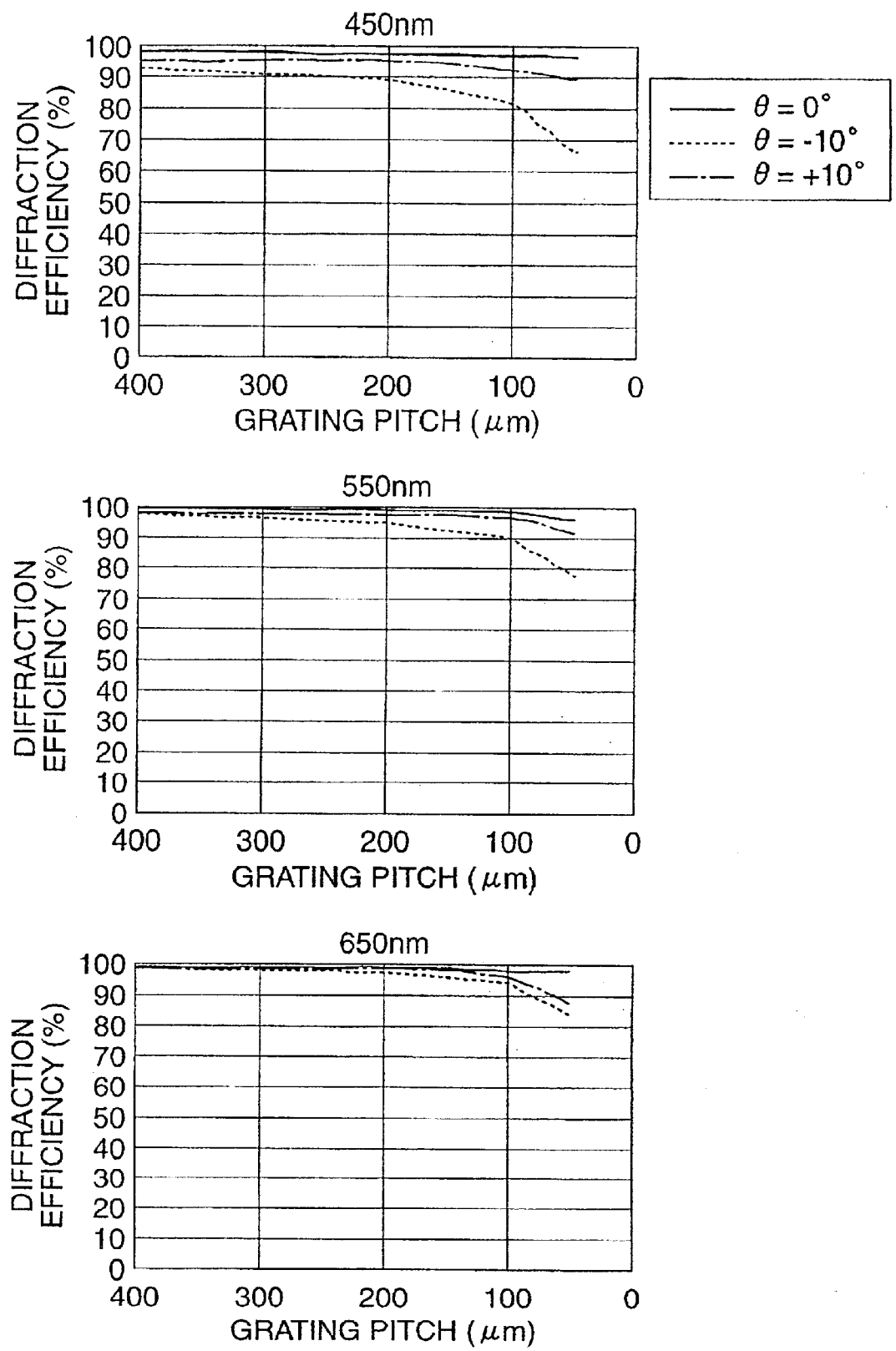
FIG. 12 shows graphs for the grating-pitch-dependent characteristics of the diffraction efficiency, at wavelengths 450 nm, 550 nm and 650 nm, for a first-order diffracted light including shading at a non-effective surface with respect to incident rays of light having the angles of incidence $\theta=0°$, $\theta=-10°$ and $\theta=+10°$ in the diffraction grating of the adjacently-laminated type of the optical system according to the first embodiment.

FIG. 11 is a table showing angles of incidence (θ), on the diffraction grating, of a center ray and marginal rays (upper and lower rays) among meridional rays of an on-axial light flux and an off-axial light flux entering the optical system according to the first embodiment. Further, FIG. 12 shows graphs for the grating-pitch-dependent characteristics of the diffraction efficiency, in wavelengths 450 nm, 550 nm and 650 nm, for a first-order diffracted light including shading at the non-effective surface of the diffraction grating with respect to incident rays of light having the angles of incidence θ=0°, θ=−10° and θ=+10° in the diffraction grating of the adjacently-laminated type shown in FIG. 10.

In general, the smaller the grating pitch, the more greatly a converted optical path length of a ray passing through the grating portion varies with respect to a change of the angle of incidence of the ray, and, therefore, the more remarkable the deterioration of the diffraction efficiency becomes. As shown in FIG. 12, the diffraction efficiency of the diffraction grating of the adjacently-laminated type that is applied to the optical system according to the first embodiment is excellent and includes a wavelength-dependent characteristic.

Then, as shown in FIG. 11, the angle of incidence θ of array in the optical system of the first embodiment takes the largest absolute value for the marginal ray (lower ray) of the maximum angle of view (the half angle of view being 3.16°), i.e., θ=+2.50°. Further, the position where the marginal ray passes through is the most marginal part of the grating portion, and, as mentioned in the foregoing, the grating pitch of the grating portion becomes a minimum value Pi=156 μm (i=155) at such a position. While the diffraction efficiency for a ray passing through that position becomes lowest, it is understood from FIG. 12 that the high efficiency equivalent to the diffraction efficiency for an incident ray having the angle of incidence θ=0° can be kept.

Next, the method for forming the laminated-type diffraction grating and the degree of freedom of design for the aberration correction and the diffraction efficiency will be described.

One of purposes of introducing the diffraction grating to an optical system having a refractive member, such as a lens, is to cancel, with the diffraction grating, chromatic aberration occurring at the refractive optical system.

Accordingly, in a case where the diffraction grating is to be provided on the surface of a lens, since the lens takes partial charge of chromatic aberration required as a refractive optical system with respect to the partial charge of chromatic aberration by the diffraction grating, it is difficult to arbitrarily select the material of the lens.

More specifically, in the case of the method of press-molding, with a mold or the like, the diffraction grating together with a lens while fusing glass at a high temperature, or in the case of the method of molding, with a mold, the diffraction grating together with a lens using plastic, the lens and the diffraction grating become made of the same material, so that the degree of freedom of selecting the material of the diffraction grating is lost. Therefore, it becomes difficult to make the correction of chromatic aberration compatible with the improvement of the wavelength-dependent characteristic of the diffraction efficiency in the laminated-type diffraction grating.

Accordingly, if such a method as to enable the materials of the lens and the diffraction grating to be selected independent of each other, for example, the method of forming the diffraction grating with ultraviolet-curable plastic, is used, it becomes possible to obtain an optical system excellent both in the correction of chromatic aberration and the diffraction efficiency. Therefore, such a forming method ought to be used.

In addition, the optical system according to the invention is applicable widely to an image pickup apparatus, such as a film camera, a video camera, a digital camera or the like, an observation apparatus, such as a telescope, a binocular or the like, a stepper (a projection exposure apparatus) for manufacturing semiconductor devices, a variety of optical measuring apparatuses, etc.

Here, an embodiment in which the optical system according to each of the first to third embodiments is applied to an optical apparatus will be described with reference to FIG. 13.

Figure 13:
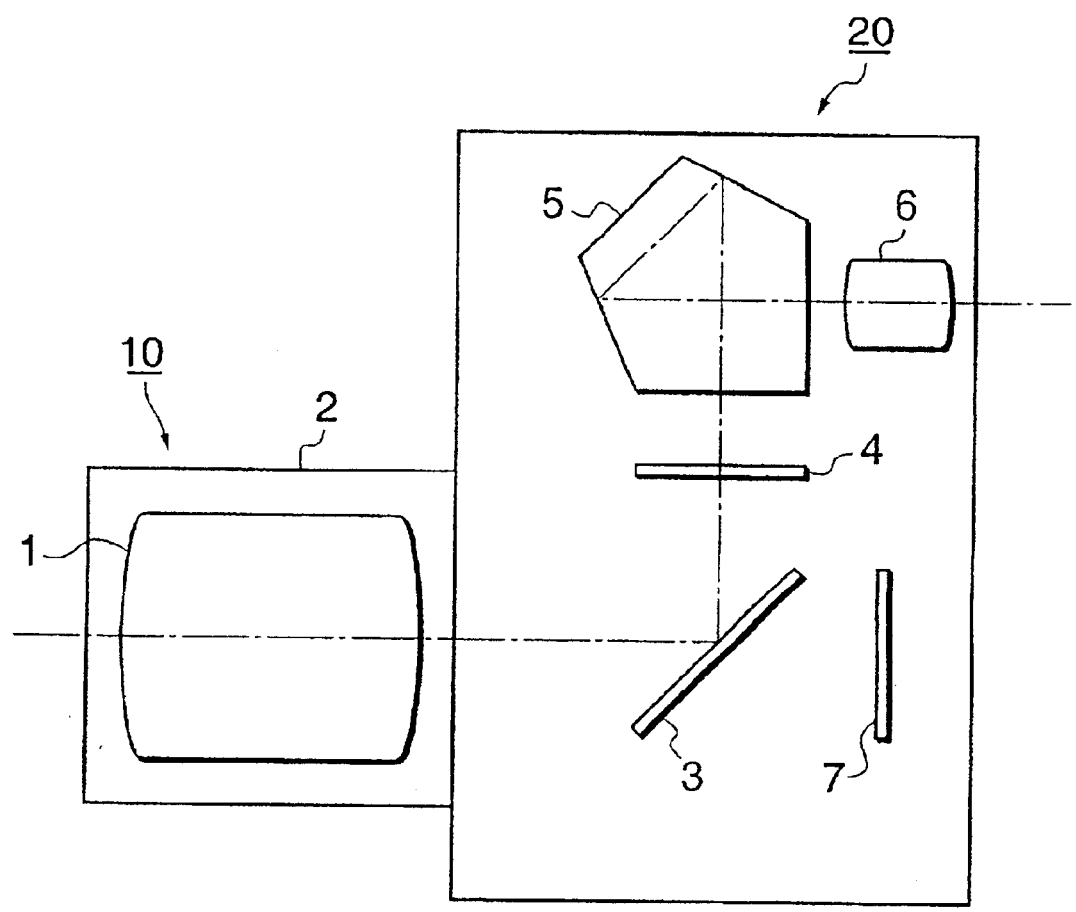
FIG. 13 is a schematic diagram showing, in outline, the arrangement of an optical apparatus (a single-lens-reflex camera) according to a further embodiment of the invention.

FIG. 13 is a schematic diagram showing, in outline, the essential parts of a single-lens reflex camera. In FIG. 13, reference numeral 10 denotes a photographic lens having an optical system 1 according to any one of the first to third embodiments. The optical system 1 is held by a lens barrel 2 serving as a holding member. Reference numeral 20 denotes a camera body, which is composed of a quick-return mirror 3 arranged to reflect upward a light flux coming from the photographic lens 10, a focusing screen 4 disposed on the image forming position of the photographic lens 10, a pentagonal roof prism 5 arranged to convert an inverted image formed on the focusing screen 4 into an erecting image, an eyepiece lens 6 provided for observing the erecting image, etc. Reference numeral 7 denotes a film surface. In taking a picture, the quick-return mirror 3 retreats from the optical path and a shutter (not shown) is opened, so that an image is formed on the film surface 7 by the photographic lens 10.

The advantageous effects mentioned in each of the first to third embodiments are effectively enjoyed by such an optical apparatus as disclosed in the present embodiment.

Next, numerical data of the numerical examples 1 to 3 of optical systems corresponding to the first to third embodiments of the invention are shown.

In the numerical data of the numerical examples 1 to 3, f denotes the focal length, Fno denotes the F-number, ω denotes a half angle of view, ri denotes the radius of curvature of the i-th surface, when counted from the object side, di denotes the separation between the i-th surface and the (i+1)th surface, when counted from the object side, ni and vi respectively denote the refractive index and Abbe number of the i-th optical member, when counted from the object side.

The shape of an aspheric surface is expressed in the coordinates with an X axis in the optical axis direction (the direction in which light advances) and an H axis in the direction perpendicular to the optical axis, with the intersection point between the aspheric surface and the X axis taken as the original point, by the following equation:

$$X = \frac{H^2/r}{1 + \sqrt{1-(H/r)^2}} + AH^2 + BH^4 + CH^6 + DH^8 + EH^{10} + FH^{12}$$

where r is the radius of curvature of a paraxial portion of the aspheric surface, and A, B, C, D, E and F are aspheric coefficients.

Further, the coefficients $C_1, C_2 \ldots$ of the shape of the diffraction grating are shown on the basis of the above-mentioned equation (a). In addition, the indication "D-X" means "$\times 10^{-X}$".

In addition, the values of the factors in the above-mentioned conditions for the numerical examples 1 to 3 are listed in Table-1.

Numerical Example 1:
f = 392.00   Fno = 1:4.12   2ω = 6.32°

| | | | | |
|---|---|---|---|---|
| r 1 = 115.683 | d 1 = 9.40 | n 1 = 1.56384 | ν 1 = 60.7 |
| r 2 = 319.640* | d 2 = 9.00 | n 2 = 1.51633 | ν 2 = 64.1 |
| r 3 = −478.031 | d 3 = 16.76 | | |
| r 4 = 96.413 | d 4 = 8.60 | n 3 = 1.51823 | ν 3 = 58.9 |
| r 5 = 472.518 | d 5 = 3.11 | | |
| r 6 = −495.228 | d 6 = 3.60 | n 4 = 1.74950 | ν 4 = 35.3 |
| r 7 = 135.791 | d 7 = 4.08 | | |
| r 8 = 71.132 | d 8 = 8.40 | n 5 = 1.48749 | ν 5 = 70.2 |
| r 9 = 245.218 | d 9 = 0.80 | | |
| r10 = 51.628 | d10 = 5.30 | n 6 = 1.67270 | ν 6 = 32.1 |
| r11 = 40.134 | d11 = 39.15 | | |
| r12 = 1141.040 | d12 = 1.80 | n 7 = 1.43387 | ν 7 = 95.1 |
| r13 = 56.180 | d13 = 22.84 | | |
| r14 = ∞ (Stop) | d14 = 10.50 | | |
| r15 = 90.269 | d15 = 1.30 | n 8 = 1.80518 | ν 8 = 25.4 |
| r16 = 34.628 | d16 = 4.70 | n 9 = 1.48749 | ν 9 = 70.2 |
| r17 = −87.040 | d17 = 0.50 | | |
| r18 = 68.906 | d18 = 3.85 | n10 = 1.76182 | ν10 = 26.5 |
| r19 = −59.203 | d19 = 1.30 | n11 = 1.80400 | ν11 = 46.6 |
| r20 = 32.357 | d20 = 3.41 | | |
| r21 = −74.136 | d21 = 1.30 | n12 = 1.80400 | ν12 = 46.6 |
| r22 = 131.844 | d22 = 1.53 | | |
| r23 = 75.659 | d23 = 6.20 | n13 = 1.63980 | ν13 = 34.5 |
| r24 = −31.349 | d24 = 1.40 | n14 = 1.80400 | ν14 = 46.6 |
| r25 = −170.115 | d25 = 14.65 | | |
| r26 = 82.731 | d26 = 6.60 | n15 = 1.51633 | ν15 = 64.1 |
| r27 = −106.118 | d27 = 0.72 | | |
| r28 = ∞ | d28 = 2.20 | n16 = 1.51633 | ν16 = 64.1 |
| r29 = ∞ | | | |

*Diffractive Surface
$C_1 = -4.22716D-05$
$C_2 = 4.71244D-10$

Numerical Example 2:
f = 51.50   Fno = 1:1.46   2ω = 45.57°

| | | | | |
|---|---|---|---|---|
| r 1 = 50.061 | d 1 = 4.15 | n 1 = 1.78000 | ν 1 = 50.0 |
| r 2 = 243.413 | d 2 = 0.10 | | |
| r 3 = 30.828 | d 3 = 3.68 | n 2 = 1.88500 | ν 2 = 41.0 |
| r 4 = 45.316 | d 4 = 1.98 | | |
| r 5 = 57.891 | d 5 = 3.40 | n 3 = 1.65070 | ν 3 = 31.8 |
| r 6 = 20.182 | d 6 = 5.87 | | |
| r 7 = ∞ (Stop) | d 7 = 10.63 | | |
| r 8 = −19.290 | d 8 = 3.40 | n 4 = 1.79528 | ν 4 = 28.1 |
| r 9 = 131.601 | d 9 = 6.77 | n 5 = 1.79558 | ν 5 = 48.3 |
| r10 = −32.350* | d10 = 1.10 | | |
| r11 = −106.926 | d11 = 5.26 | n 6 = 1.88430 | ν 6 = 40.4 |
| r12 = −36.060 | d12 = 0.10 | | |

-continued

Numerical Example 2:
f = 51.50   Fno = 1:1.46   2ω = 45.57°

| | | | | |
|---|---|---|---|---|
| r13 = 82.121 | d13 = 3.60 | n 7 = 1.88500 | ν 7 = 41.0 |
| r14 = 455.723 | | | |

*Diffractive Surface
$C_1 = -2.252500D-04$
$C_2 = 4.0128D-07$
$C_3 = -4.53740D-10$ Numerical Example 3:
f = 24.61   Fno = 1:1.45   2ω = 82.64°

| | | | | |
|---|---|---|---|---|
| r 1 = 62.320 | d 1 = 2.80 | n 1 = 1.69680 | ν 1 = 55.5 |
| r 2 = 31.224 | d 2 = 5.77 | | |
| r 3 = 58.654 | d 3 = 2.30 | n 2 = 1.69680 | ν 2 = 55.5 |
| r 4 = 32.021 | d 4 = 6.94 | | |
| r 5 = 220.248 | d 5 = 4.36 | n 3 = 1.71300 | ν 3 = 53.8 |
| r 6 = −101.757 | d 6 = 4.09 | | |
| r 7 = 72.682 | d 7 = 2.96 | n 4 = 1.84666 | ν 4 = 23.8 |
| r 8 = 340.356 | d 8 = 1.70 | n 5 = 1.49700 | ν 5 = 81.6 |
| r 9 = 23.248 | d 9 = 12.21 | | |
| r10 = 30.622 | d10 = 6.82 | n 6 = 1.80400 | ν 6 = 46.6 |
| r11 = 58.996 | d11 = 0.15 | | |
| r12 = −1174.273 | d12 = 1.48 | n 7 = 1.72825 | ν 7 = 28.5 |
| r13 = 38.385 | d13 = 4.63 | | |
| r14 = ∞ (Stop) | d14 = 7.99 | | |
| r15 = 16.394 | d15 = 4.66 | n 8 = 1.84666 | ν 8 = 23.9 |
| r16 = −37.366** | d16 = 0.15 | | |
| r17 = −201.177 | d17 = 7.04 | n 9 = 1.60311 | ν 9 = 60.7 |
| r18 = −23.231* | d18 = 0.15 | | |
| r19 = −86.014 | d19 = 5.55 | n10 = 1.77250 | ν10 = 49.6 |
| r20 = −29.191 | | | |

*Diffractive Surface
**Aspheric Surface

A = 0.00000D+00   B = 2.10265D-05   C = 1.79508D-08
D = −1.59961D-11   E = −1.82408D-13   F = 2.10282D-16
$C_1$ = −4.42491D-04   $C_2$ = 3.53506D-07   $C_3$ = 3.46931D-11
$C_4$ = 2.27434D-12   $C_5$ = −2.17625D-15   $C_6$ = 9.09469D-18
$C_7$ = −2.48396D-20   $C_8$ = 9.80318D-23   $C_9$ = −1.98660D-24
$C_{10}$ = 8.60378D-27

TABLE 1

| Condition | | Numerical Example | | |
|---|---|---|---|---|
| No. | Factor | 1 | 2 | 3 |
| (1) | \|D/R\| | 0.026 | 1.172 | 2.801 |
| (2) | $C_1 \cdot P$ | 6.29847D-09 | −6.20948D-06 | −1.14875D-05 |

With the above-described elements defined as set forth in each of the embodiments, it is possible to attain an optical system having such high optical performance that, when effecting achromatism by combining a diffractive optical element and a refractive optical element, the diffraction efficiency excellent over the entire image plane can be obtained even if light fluxes which are to reach respective positions of the image plane overlap each other greatly on a diffractive optical surface.

What is claimed is:

1. An optical system, comprising:
    a diffractive optical element having a diffraction grating provided, on a lens surface having curvature, in a concentric-circles shape rotationally-symmetrical with respect to an optical axis, wherein a sign of the curvature of the lens surface having said diffraction grating provided thereon is the same as a sign of a focal length, in a design wavelength, of a system composed of, in said optical system, a surface disposed nearest to a front side to a surface disposed immediately before the lens surface having said diffraction grating thereon, and is different from a sign of a distance from the optical axis to a position where a center ray of an off-axial light flux enters the lens surface having said diffraction grating provided thereon, wherein the following condition is satisfied:

$$|DL/R|<0.3$$

where DL is a distance from (a) the apex of an imaginary cone formed by extending a non-effective surface of said diffraction grating to (b) the center of curvature of the lens surface having said diffraction grating provided thereon, and R is a radius of curvature of the lens surface having said diffraction grating provided thereon.

2. An optical system according to claim 1, wherein said optical system satisfies the following condition:

$$|D/R|<5$$

where D is a distance from the center of curvature of the lens surface having said diffraction grating provided thereon to a focus, at the design wavelength, of the system composed of, in said optical system, the surface disposed nearest to the front side to the surface disposed immediately before the lens surface having said diffraction grating provided thereon.

3. An optical system according to claim 1, wherein said optical system satisfies the following condition:

$$C_1 \cdot P < 0$$

where P is a refractive power of the lens surface having said diffraction grating provided thereon, and $C_1$ is a phase coefficient for a second-degree term when a phase shape of said diffraction grating is expressed by the following equation:

$$\phi(Y)=(2\pi/\lambda_0)(C_1Y^2+C_2Y^4+C_3Y^6+\ldots)$$

where Y is the height in a vertical direction from the optical axis, $\lambda_0$ is the design wavelength, and $C_i$ is a phase coefficient (i=1, 2, 3 . . . ).

4. An optical system according to claim 1, wherein said diffraction grating is a laminated diffraction grating.

5. An optical system according to claim 4, wherein said laminated diffraction grating is an adjacently-laminated diffraction grating in which two diffraction gratings are disposed adjacent to each other across an air layer.

6. An optical apparatus comprising an optical system according to claim 5, wherein said adjacently-laminated diffraction grating is provided between two adjacent lens surfaces having substantially the same curvature, and is composed of three layers, including, in order from the front side, a first layer, a second layer and a third layer, said second layer being the air layer, wherein said optical apparatus is selected from the group of optical apparatuses consisting of an image pickup apparatus, a film camera, a video camera, a digital camera, an observation apparatus, a telescope, a binocular, a projection exposure apparatus, and a stepper for manufacturing a semiconductor device.

7. An optical system according to claim 5, wherein each of said two diffraction gratings of said adjacently-laminated diffraction grating are formed with ultraviolet-curable plastic.

8. An optical system according to claim 1, wherein said diffraction grating is a blazed-type diffraction grating.

9. An optical apparatus comprising:

an optical system comprising a diffractive optical element having a diffraction grating provided, on a lens surface having curvature, in a concentric-circles shape rotationally-symmetrical with respect to an optical axis, wherein a sign of the curvature of the lens surface having said diffraction grating provided thereon is the same as a sign of a focal length, in a design wavelength, of a system composed of, in said optical system, a surface disposed nearest to a front side to a surface disposed immediately before the lens surface having said diffraction grating thereon, and is different from a sign of a distance from the optical axis to a position where a center ray of an off-axial light flux enters the lens surface having said diffraction grating provided thereon, wherein the following condition is satisfied:

$$|DL/R|<0.3$$

where DL is a distance from (a) the apex of an imaginary cone formed by extending a non-effective surface of said diffraction grating to (b) the center of curvature of the lens surface having said diffraction grating provided thereon, and R is a radius of curvature of the lens surface having said diffraction grating provided thereon.

10. An optical apparatus according to claim 9, wherein said optical apparatus is selected from the group of optical apparatuses consisting of an image pickup apparatus, a film camera, a video camera, a digital camera, an observation apparatus, a telescope, a binocular, a projection exposure apparatus, and a stepper for manufacturing a semiconductor device.

11. An optical system, comprising:

a diffractive optical element having a diffraction grating provided, on a lens surface having curvature, in a concentric-circles shape rotationally-symmetrical with respect to an optical axis, wherein a sign of the curvature of the lens surface having said diffraction grating provided thereon is the same as a sign of a focal length, in a design wavelength, of a system composed of, in said optical system, a surface disposed nearest to a front side to a surface disposed immediately before the lens surface having said diffraction grating thereon, and is different from a sign of a distance from the optical axis to a position where a center ray of an off-axial light flux enters the lens surface having said diffraction grating provided thereon, wherein an apex of an imaginary cone formed by extending a non-effective surface of said diffraction grating is located adjacent to the center of curvature of the lens surface having said diffraction grating provided thereon, wherein said diffraction grating is a laminated diffraction grating, and wherein said laminated diffraction grating is an adjacently-laminated diffraction grating in which two diffraction gratings are disposed adjacent to each other across an air layer.

12. An optical system according to claim 11, wherein each of said two diffraction gratings of said adjacently-laminated diffraction grating are formed with ultraviolet-curable plastic.

13. An optical apparatus, comprising:

an optical system according to claim 11.

14. An optical apparatus according to claim 13, wherein said optical apparatus is selected from the group of optical apparatuses consisting of an image pickup apparatus, a film camera, a video camera, a digital camera, an observation apparatus, a telescope, a binocular, a projection exposure apparatus, and a stepper for manufacturing a semiconductor device.

15. An optical apparatus according to claim 14, wherein said adjacently-laminated diffraction grating is provided between two adjacent lens surfaces having substantially the same curvature, and is composed of three layers, including, in order from the front side, a first layer, a second layer and a third layer, said second layer being the air layer.

16. An optical system, comprising:

a diffractive optical element having a diffraction grating provided, on a lens surface having curvature, in a concentric-circles shape rotationally-symmetrical with respect to an optical axis, wherein a sign of the curvature of the lens surface having said diffraction grating provided thereon is the same as a sign of a focal length, in a design wavelength, of a system composed of, in said optical system, a surface disposed nearest to a front side to a surface disposed immediately before the lens surface having said diffraction grating thereon, and is different from a sign of a distance from the optical axis to a position where a center ray of an off-axial light flux enters the lens surface having said diffraction grating provided thereon, wherein the following condition is satisfied:

$$|DL/R|<0.3$$

where DL is a distance from (a) the apex of an imaginary cone formed by extending a non-effective surface of said diffraction grating to (b) the center of curvature of the lens surface having said diffraction grating provided thereon, and R is a radius of curvature of the lens surface having said diffraction grating provided thereon, wherein the apex of the imaginary cone is located on the optical axis, and wherein said diffraction grating is entirely a blazed-type diffraction grating.

* * * * *

UNITED STATES PATENT AND TRADEMARK OFFICE
CERTIFICATE OF CORRECTION

PATENT NO. : 6,825,979 B2
DATED : November 30, 2004
INVENTOR(S) : Hideki Ogawa

It is certified that error appears in the above-identified patent and that said Letters Patent is hereby corrected as shown below:

Column 2,
Line 6, "diffraction At" should read -- diffraction --.
Line 40, "relatively-large" should read -- relatively large --.

Column 4,
Line 47, "la" should read -- 1a --.

Column 5,
Line 29, "(i.e," should read -- (i.e., --.

Column 6,
Line 8, "axis.)" should read -- axis) --.
Line 11, "Ha<O and Ra>O and" should read -- Ha<0 and Ra>0, and --.

Column 7,
Line 37, "C," should read -- $C_1$ --.

Column 9,
Line 19, "portions and," should read -- portion, and, --.

Column 10,
Line 66, "e" should read -- $\theta$ --.

Column 11,
Line 39, "2.50°" should read -- 2.5° --
Line 52, "One of" should read -- One of the --.

Column 13,
Line 64, "d10 = 1.10" should read -- d10 = 0.10 --.

UNITED STATES PATENT AND TRADEMARK OFFICE
CERTIFICATE OF CORRECTION

PATENT NO. : 6,825,979 B2
DATED : November 30, 2004
INVENTOR(S) : Hideki Ogawa

It is certified that error appears in the above-identified patent and that said Letters Patent is hereby corrected as shown below:

Column 14,
Line 9, "$C_1 = -2.252500D-04$" should read -- $C_1 = -2.52500D-04$ --.
Line 10, "$C_2 = 4.0128D-07$" should read -- $C_2 = 4.01280D-07$ --.
Line 25, "58.996" should read -- -58.996 --.
Line 29, "16.394" should read -- -16.394 --.

Signed and Sealed this

Twenty-sixth Day of April, 2005

JON W. DUDAS
*Director of the United States Patent and Trademark Office*